United States Patent
Abell et al.

(10) Patent No.: US 9,320,999 B2
(45) Date of Patent: Apr. 26, 2016

(54) METHOD AND DEVICE FOR REMOVING AIRBORNE POLLUTANTS

(71) Applicants: Ned Abell, Encinitas, CA (US); Mark D Chambers, Livingston, TX (US); Ross L Anderson, Huntington Beach, CA (US)

(72) Inventors: Ned Abell, Encinitas, CA (US); Mark D Chambers, Livingston, TX (US); Ross L Anderson, Huntington Beach, CA (US)

(*) Notice: Subject to any disclaimer, the term of this patent is extended or adjusted under 35 U.S.C. 154(b) by 128 days.

(21) Appl. No.: 14/120,227

(22) Filed: May 7, 2014

(65) Prior Publication Data

US 2015/0321134 A1    Nov. 12, 2015

(51) Int. Cl.
- *B01D 46/00* (2006.01)
- *B01D 46/10* (2006.01)
- *B01D 46/54* (2006.01)

(52) U.S. Cl.
CPC .............. *B01D 46/10* (2013.01); *B01D 46/54* (2013.01); *B01D 2221/16* (2013.01); *B01D 2275/10* (2013.01); *B01D 2279/40* (2013.01)

(58) Field of Classification Search
CPC .......... B01D 46/0023; B01D 46/0024; B01D 53/02; B01D 53/261; B60H 1/262; B32B 27/322; A61L 9/16
USPC .............. 55/318, 482, 487; 96/154; 180/54.1; 422/121; 454/143
See application file for complete search history.

(56) References Cited

U.S. PATENT DOCUMENTS

| | | | |
|---|---|---|---|
| 1,406,530 A | | 2/1922 | Brenneisen |
| 4,594,082 A | * | 6/1986 | Catherwood, Sr. .. B01D 53/261 55/318 |
| 5,162,053 A | | 11/1992 | Kowalski |
| 5,358,442 A | * | 10/1994 | Ekinci .................... B60H 1/262 454/143 |
| 6,340,066 B1 | * | 1/2002 | Dettling ................. B01D 53/02 180/54.1 |
| 7,094,268 B2 | | 8/2006 | Krantz |
| 7,323,146 B2 | * | 1/2008 | Kim ......................... A61L 9/16 422/121 |
| 7,833,302 B2 | | 11/2010 | Krantz |
| 8,025,132 B2 | | 9/2011 | Krantz |
| 8,167,098 B2 | | 5/2012 | Jessberger |
| 2005/0000197 A1 | | 1/2005 | Krantz |
| 2006/0230729 A1 | | 10/2006 | Tabrizi |
| 2007/0056254 A1 | | 3/2007 | Relyea |
| 2011/0056383 A1 | | 3/2011 | Make |
| 2011/0214568 A1 | | 9/2011 | Krantz |
| 2015/0052865 A1 | * | 2/2015 | Jackson ............. B01D 46/0024 55/487 |
| 2015/0082757 A1 | * | 3/2015 | Chaen ................... B32B 27/322 55/482 |
| 2015/0314226 A1 | * | 11/2015 | Patel .................. B01D 46/0023 96/154 |

FOREIGN PATENT DOCUMENTS

WO    WO 2008/049829    5/2008

* cited by examiner

*Primary Examiner* — Duane Smith
*Assistant Examiner* — Minh-Chau Pham

(57) ABSTRACT

A multilayer filter with a material structure to allow air flow therethrough is positioned in front of a radiator of a land vehicle for removal of airborne pollutants from the environment. Each layer of the multifilter is formed of a pollutant capture material. Layers of filter material may be formed of a hepa material, a carbon material, a magnetized material or a spongy material. A protective screen may be positioned in front of the filter air intake side.

9 Claims, 3 Drawing Sheets

METHOD AND DEVICE FOR REMOVING AIRBORNE POLLUTANTS

BACKGROUND OF THE INVENTION

This invention relates to methods and devices for removing airborne pollutants from the environment experienced by moving roadway vehicles. The new method and device positions one or more pollutant filters in a land vehicle between the forward end and the radiator in an open area, duct structure, or air intake.

Various apparatus and devices may be known for capture or collection of roadway pollutants. These systems may include an air intake device, a fan or other apparatus and a particulate filter with a particulate storage container, for example, U.S. Patent Application No. 2007/0056254. In this disclosure the air intake device is positioned in the front of the vehicle, but may be positioned in multiple locations throughout the motorized vehicle. The apparatus is complicated in that a motorized vehicle must be modified to at least include an air intake device, particulate filter and particulate repository with fluid passages or tubing connecting the various parts of the apparatus. These types of apparatus and systems may take various structural forms, but in general are complex and require modifications to motorized vehicles.

Another example is the various U.S. patents and patent applications of Krantz of which U.S. Pat. No. 7,094,268, issued Aug. 22, 2006, is a general representation of a system and method for removing pollutants from a roadway. The method and system is structured to position a pollutant trap where it can be exposed to a roadway pollutant by affixing the pollutant trap, for example, in the wheel well, on a mud flap, or the underside of a vehicle or another suitable place where the pollution trap can be exposed to a roadway pollutant as described and disclosed in the Abstract and Detailed Description. The method emphasizes positioning pollutant traps in wheel wells, on splash guards or mud flaps, and under vehicles where an induced vacuum may be created to suck road surface pollutants to be disposed on pollutant traps. The patent states the pollution traps disclosed can be disposed anywhere on the vehicles where the pollutant trap pad can be exposed to roadway pollutants with teaching and emphasis on positioning in wheel wells and on mud flaps.

What is needed is a method and filter device that is easily positioned on and removable from roadway vehicles as a simple modification to a vehicle structure for removing airborne pollutants from the environment whether they are roadway pollutants or not.

There are numerous studies regarding the airborne pollution content of environmental air in the vicinity where land vehicles travel that includes vehicle pollutants, roadway pollutants, and general surrounding environment location pollutants. Use of existing vehicles with easily installed and removed filters for the removal of airborne pollutants will significantly aid in cleaning up the environment.

Pollution, pollutants, particulates and contaminants have been in the environment for years. The air we breathe has been improved over the years with more efficient cars and the invention of the catalytic converter. Smog and vehicle exhaust has been reduced. Yet, health problems continue to exist on a nationwide basis, covering the gamut from asthma and other respiratory illnesses to heart disease to cancer. Studies have shown that these adverse health impacts are greater within three miles of busily traveled roadways, and that approximately 40% of the American population lives next to a "busy road".

What most studies haven't truly focused on is the defined pollutants as listed in the Detail Description section of this patent application that abound in the air next to these busily traveled roadways. The Applicant's experiments and lab tests have shown that a roadway vehicle operating with our flow thru air filter removes harmful particles, contaminants and pollutants from the environment. Imagine the pollutants removed if 10 million roadway vehicles used these filters.

Currently, individuals are freely and unknowingly breathing these pollutants, not knowing the enormous risk and health factors. It is believed to be important that these pollutants be removed from the environment, just as it was important back in the 1960s that the smog levels be reduced. A somewhat direct correlation is now beginning to be made between the breathing of these pollutants and health problems, including general health issues, respiratory illnesses, heart disease, bronchitis, and lung cancer. In children, it has been determined that breathing certain levels of air pollution and pollutants has adverse effects on lung growth, leading to significant risks in developing asthma and other ailments, up to and including cancer. These Pollutants on, around and near roadways are ingested by individuals, get lodged in the lungs, absorbed into the bloodstream, and into one's cells which creates enormous health risks for everyone. Though the body attempts to filter and dissolve the ingested pollutants it doesn't get them all. The pollutants that aren't filtered move around the body, through cell walls, and invade various tissues and organs.

Roadway vehicles may run cleaner and emit less pollution today than in years past, but they are still emitting numerous amounts of by-products, such as brake dust, rubber particles, fine metal toxins, exhaust, unseen toxic fragments, soot, oxides, etc., all of which are harmful to one's health and the environment. Some of these by-products are visible, some are not. The Applicant's studies have shown that some doctors have reported as much as 50-75% of their patients complain of some sort of upper respiratory (breathing) issues. Additionally, people that have never smoked are getting lung cancer. Various studies are now confirming, that the culprit of these ailments as to do with Pollutants in and around roadways.

SUMMARY OF THE INVENTION

The present invention is directed to methods and devices for removal of airborne pollutants from the environment using moving land vehicles. A multilayer filter with a material structure to allow air flow therethrough is positioned in, front of a radiator of a land vehicle. Each layer of the multilayer filter is formed of a pollutant capture material. Layers of filter material may be formed of a hepa material, a carbon material, a magnetized material or a spongy material. A protective screen may be positioned in front of the filter air intake side.

These and other features, aspects and advantages of the present invention will become better understood with reference to the following drawings, description and claims.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
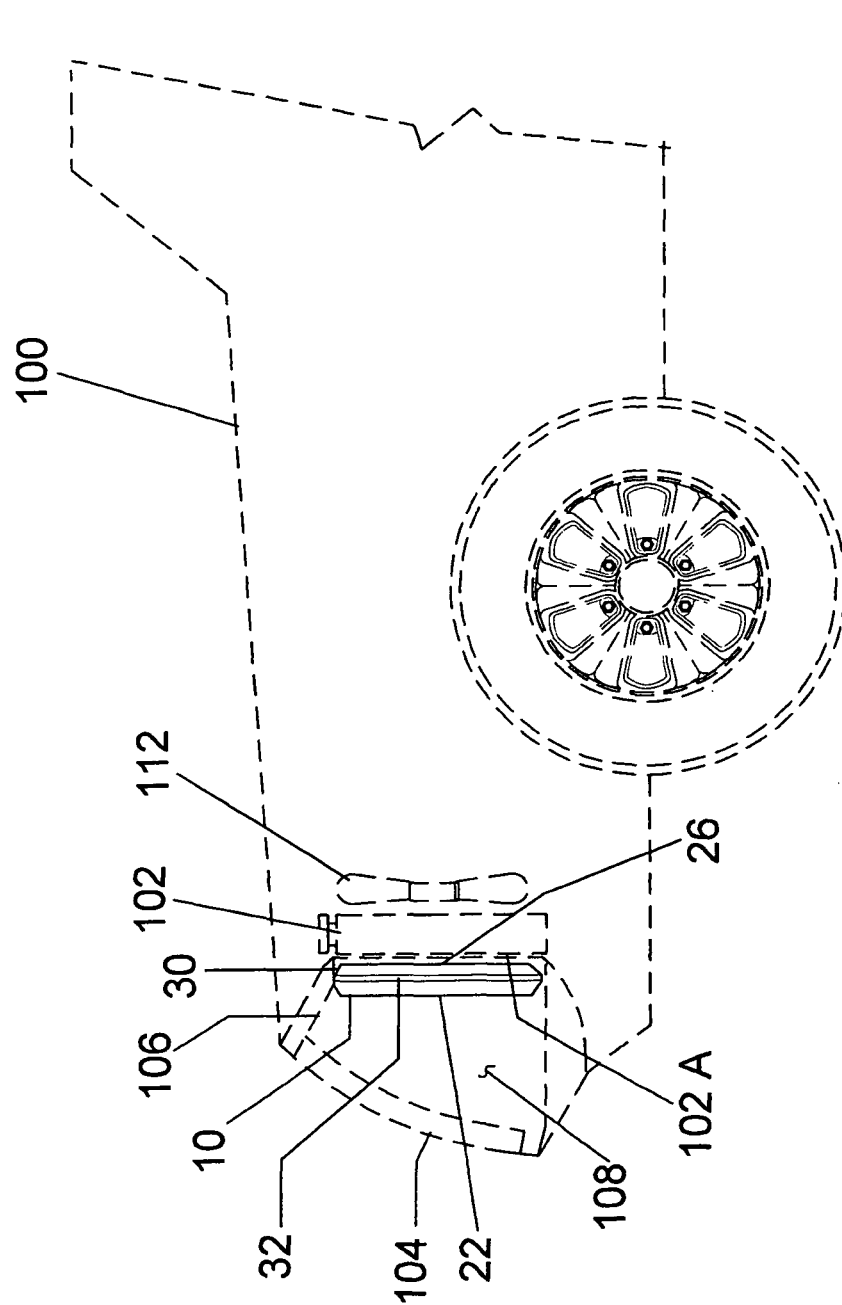
FIG. 1 illustrates a side view of a filter positioned in a land vehicle according to an embodiment of the invention.
Figure 2:
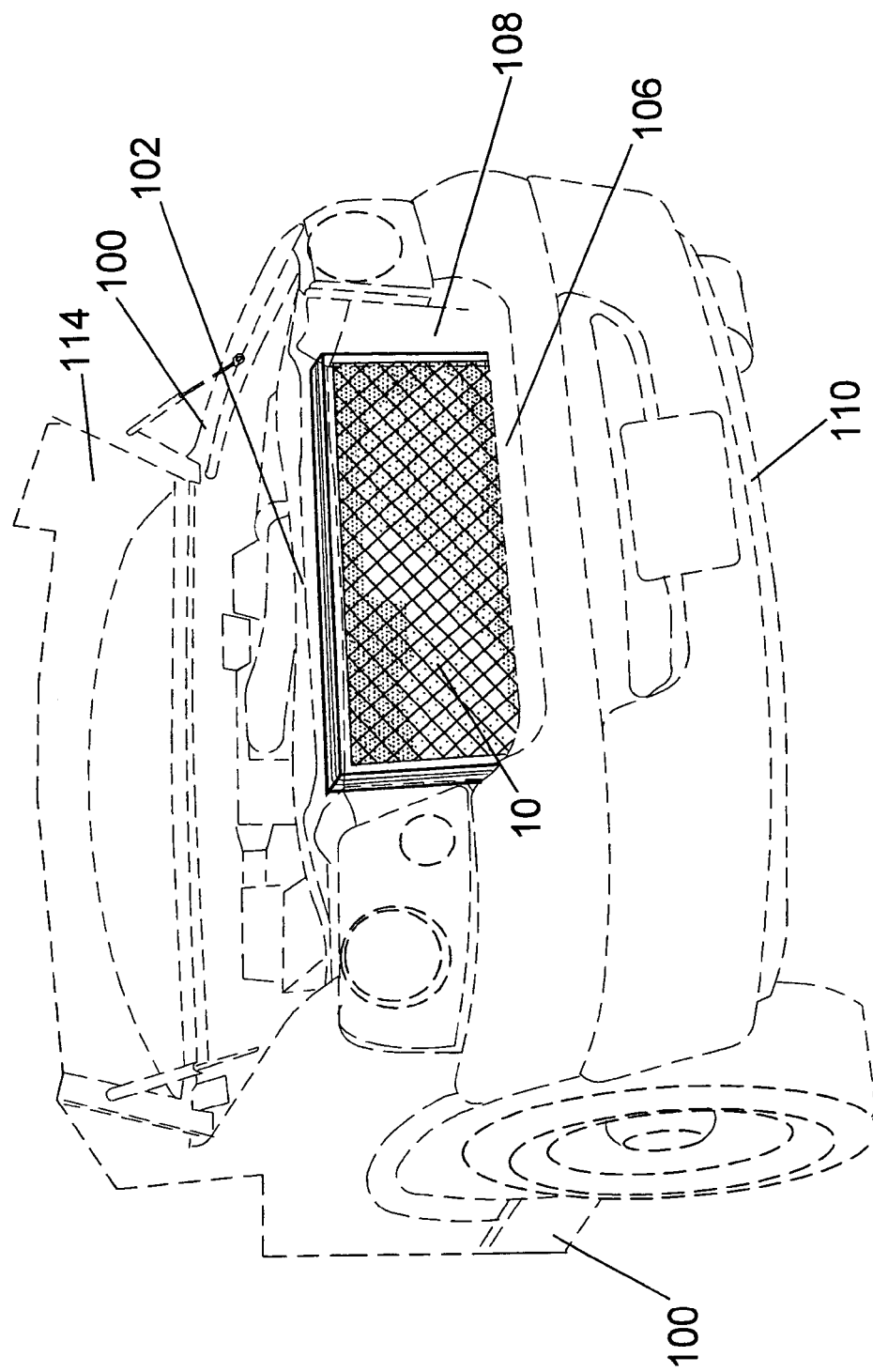
FIG. 2 illustrates a perspective view of a filter positioned on a land vehicle according to an embodiment of the invention.
Figure 3:
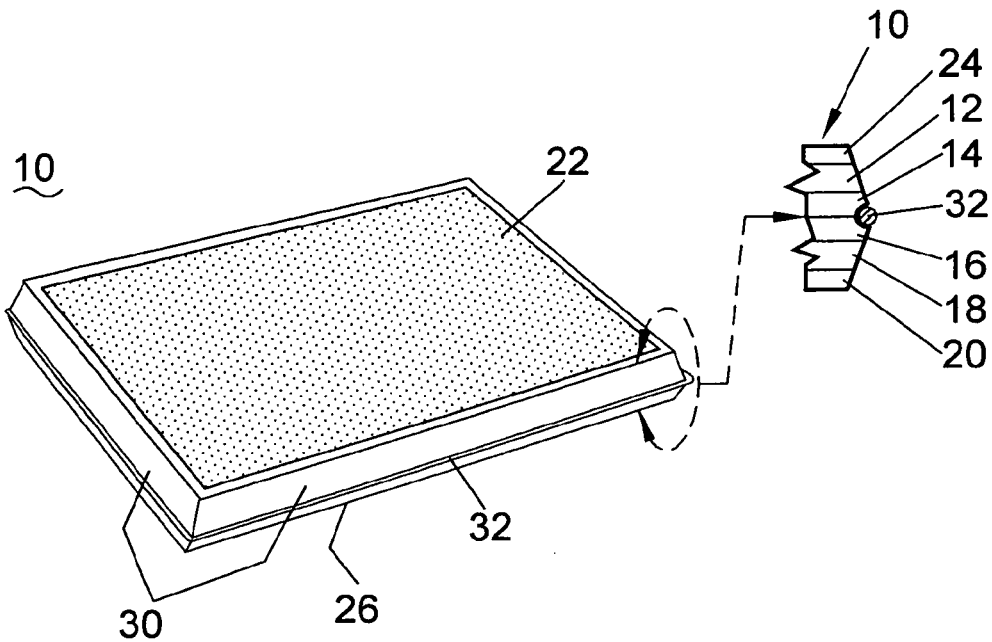
FIG. 3 illustrates a perspective view of a filter according to an embodiment of the invention.
Figure 4:
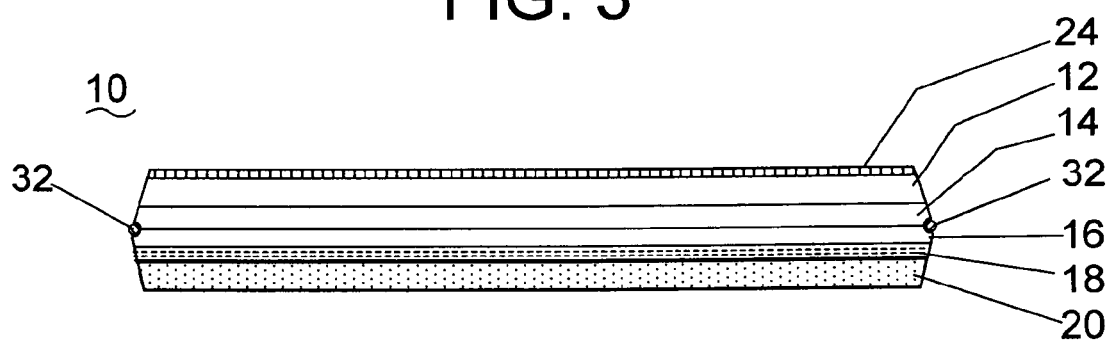
FIG. 4 illustrates a side cross section view of a filter according to an embodiment of the invention.
Figure 5:
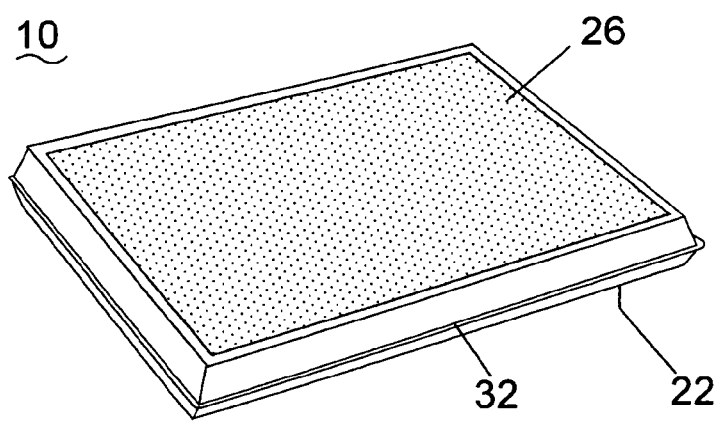
FIG. 5 illustrates a perspective view of a filter with a springy, flexible wire embedded in the peripheral edge of the filter according to an embodiment of the invention.

Referring to FIGS. 1 through 5, a representative four stage filter 10 has a magnetized layer 12, a hepa layer 14, a carbon layer 16, and a second hepa layer 18 saturated with an all-natural mineral oil. There may also be a spongy layer 20 as part of filter 10. The air intake side 22 of the filter 10 may have a flexible protective screen layer 24 to protect the filter 10 from large objects. The filter 10 is formed with a peripheral edge 30 shape to be positioned in front of a radiator 102 of a type of land vehicle 100. This will position the filter 10 in the open area 108 behind the forward end 110 and protective grill 104 of the land vehicle 100. The vehicle may have a generally open area 108 between the forward ends 110 structure or may have a duct structure 106 to channel incident air into the radiator 102 structure.

The filter 10 may be formed of materials that result in a general rigid structure to be positioned in front of a flat radiator 102 front surface 102A. Various types of fastening devices (not shown) such as Velcro, clips, self-taping screws and the like may be used to removably attach the filter 10 in position. For some applications the filter 10 may be flexible adjacent one or more of the peripheral edges 30 to allow the filter 10 to be positioned in irregular structural elements of a vehicle 100 in the location of the radiator 102. A springy, flexible wire or band 32 may be embedded in the peripheral edge 30 to allow deforming the filter 10 to wedge the filter 10 into the structure around the front of the radiator 102 in the vehicle 100. This may allow a flexible filter 10 with wire 32 to be twisted to fit into areas behind the forward end 110 that may be under the hood 114 of a vehicle 100 to be positioned between the area of the radiator 102 and the grill 104 where there are spaces in the metal structure above and below the grill 104 and between the radiator 102 and grill 104. Use of flexible wire 32 edging allows ease of removal and replacement of a filter 10 when needed. The filter 10 structure may also have a springy composition such that it may be wedged between structural elements of a vehicle 100 in front of the radiator 102 for the filter 10 to be retained in place. The filter 10 may be installed to be easily removed when filled with pollutant material.

The filter 10 is formed of layers 12 through 18 of material that allow sufficient air flow through the filter 10 to the radiator 102 of the vehicle 100 when the vehicle 100 is operating in order for proper cooling of the vehicle 100. Examples of filter material structure for air flow and airborne pollution screening or capture are as follows. The filter 10 may have 1 to 10 layers that may be composed of any of the following materials: carbon, paper, foam, cotton, hepa, fiberglass, mineral oil, spongy material, magnetic material, synthetic material, and any sticky substance that pollutants may adhere to; and any air filtration material available now or in the future. The filter structure including materials is designed to withstand temperatures in the vehicle 100 forward end 110 under the hood 114 environment. Fire retardant materials of between 50 degrees and 400 degrees Fahrenheit may be used. A filter 10 may have a 2 micron to 5 micron screen size and be 0.1 inches to 4.0 inches thick. The word "pollutants" as used herein is defined as hydrocarbons, vehicle exhaust, diesel fragments, particulates, asbestos, contaminants, metals, brake and rubber dust, carcinogens, nitrates, sulfates, soot, oxides, dust, grime, debris, carbon monoxide, carbons, and sulfur dioxide. Metals that have been tested for filter 10 capture include: antimony, arsenic, barium, cadmium, chromium, cobalt, copper, lead, molybdenum, nickel, silver, vanadium and zinc.

The filter 10 shape will vary in planar size and in thickness depending on the size of the vehicle. The filter 10 may be designed to fill the open area 108 or compartment open space between the radiator 102 and the front protective grill 104 of the vehicle 100. The filters 10 may be structured in multiple sizes and may be compressible or expandable to fit the size of manufactured land vehicles 100. The peripheral edge 30 of a filter 10 may have a heat resistant inflatable bag or bladder (not shown) attached around the peripheral edge 30 of the filter 10 that may be expanded as part of the filter 10 installation in the vehicle 100 to fit the filter 10 structure in position or to fill the open area 108. The filter 10 will generally be rectangular three dimensional box shape with a generally thin thickness, but may vary in planar shape depending on a vehicle 100 open area 108, duct structure 106 or radiator 102 shape. A generally rectangular filter 10 may be designed to fit in front of a radiator 102 or to be arranged in side by side relationship as two or more filters 10 in front of a specifically shaped radiator 102. The word "planar" as used herein refers to a filter 10 having a generally two dimensional quality of length and width with a thinner third dimension or thickness.

While the invention has been particularly shown and described with respect to the illustrated embodiments thereof, it will be understood by those skilled in the art that the foregoing and other changes in form and details may be made therein without departing from the spirit and scope of the invention.

We claim:

1. A method for removing airborne pollutants using a vehicle comprising the steps of:
   a. compressing a multilayer filter having a peripheral edge in a forward section of a vehicle, wherein each layer of the multilayer filter is configured to compress;
   b. placing the multilayer filter in a space within the forward section of a vehicle, wherein the space is behind the front of the vehicle;
   c. the multilayer filter expanding to fit the space, wherein one or more surfaces of the multilayer filter is in communication with one or more surfaces of the space, and wherein the multilayer filter is held in place as the multilayer filter expands against the one or more surfaces of the space;
   d. driving the vehicle, wherein external airflow moves through the forward section of the vehicle, wherein the external airflow contains airborne pollutants, and wherein the airborne pollutants contact the multilayer filter; and
   e. the multilayer filter retaining the airborne pollutants within one or more layers.

2. The method of claim 1, wherein each one of the layers of the multilayer filter is constructed of a material selected from the group consisting of: magnetic material, hepa material, carbon material, paper, foam, cotton, fiberglass, spongy material, synthetic material, and sticky material oil.

3. The method of claim 2, wherein a first layer of the multilayer filter comprises a screen configured to protect the multilayer filter.

4. The method of claim 1, wherein the peripheral edge comprises a springy wire.

5. The method of claim 1, wherein the step of placing the multilayer filter further comprises installing the multilayer filter, wherein the multilayer filter is in communication with a radiator in the forward section of a vehicle, and wherein a plurality of clips are configured to attach the multilayer filter to the radiator.

6. A compressible filter comprising:
   a. one or more layers, wherein each of the one or more layers is constructed using a material selected from the group consisting of: carbon, paper, foam, cotton, hepa, fiberglass, mineral oil, spongy material, magnetic material, and synthetic material; and
   b. a springy peripheral edge configured to retain a shape of the compressible filter,
     wherein the compressible filter is resilient.

7. The compressible filter of claim 6, further comprising:
   a. a wire in the peripheral edge of the compressible filter;
   b. oil, wherein at least one of the one or more layers is saturated with the oil; and
   c. a screen configured to protect the compressible filter.

8. The method of claim 5, wherein the multilayer filter is in communication with a front surface of the radiator, wherein the front surface of the radiator is towards the front of the vehicle.

9. The method of claim 1, wherein at least one layer of the multilayer filter is saturated with an oil.

\* \* \* \* \*